US012745308B2

(12) United States Patent
McGinn

(10) Patent No.: US 12,745,308 B2
(45) Date of Patent: Sep. 22, 2026

(54) ONBOARDING POLICY CHARGING FUNCTIONS IN WIRELESS NETWORKS

(71) Applicant: T-MOBILE INNOVATIONS LLC, Overland Park, KS (US)

(72) Inventor: Ryan J. McGinn, Shawnee, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 279 days.

(21) Appl. No.: 18/584,379

(22) Filed: Feb. 22, 2024

(65) Prior Publication Data

US 2025/0275009 A1 Aug. 28, 2025

(51) Int. Cl.
*H04W 76/25* (2018.01)
*H04W 24/04* (2009.01)

(52) U.S. Cl.
CPC ........... *H04W 76/25* (2018.02); *H04W 24/04* (2013.01)

(58) Field of Classification Search
CPC .............................. H04W 76/25; H04W 24/04
USPC ........................ 455/422.1, 403; 370/328, 338
See application file for complete search history.

(56) References Cited

U.S. PATENT DOCUMENTS

2020/0252785 A1* 8/2020 Wu ........................ H04W 28/06
2022/0030656 A1* 1/2022 Afzal .................. H04L 12/1407
2023/0292398 A1* 9/2023 Song ........................ H04W 8/18
2023/0397021 A1* 12/2023 Steben ................ H04L 41/0806
2024/0244414 A1* 7/2024 Zhao ........................ H04L 69/40
2024/0284177 A1* 8/2024 Krishan .............. G06F 21/6218
2025/0141704 A1* 5/2025 Belling ................... H04L 12/14

* cited by examiner

*Primary Examiner* — Juan A Torres

(57) ABSTRACT

Various embodiments relate to onboarding a policy charging function (PCF) of a wireless network to replace another network PCF. In an implementation, a network repository function (NRF) determines that a first PCF is offline or unavailable and identifies at least one other network function which is subscribed to the first PCF. The NRF instructs the network function to replace an identity of the first PCF with an identity of a second PCF in a PCF profile maintained by the network function. The network function, in response to the instruction, sends to the second PCF session information for active sessions associated with the first PCF along with a flag indicating that the active sessions are active. The second PCF receives the session information and rebuilds the active sessions in a database. The second PCF then manages the active sessions based on the session information in place of the first PCF.

20 Claims, 7 Drawing Sheets

ONBOARDING POLICY CHARGING FUNCTIONS IN WIRELESS NETWORKS

TECHNICAL FIELD

Aspects of the disclosure are related to the field of wireless communication networks and in particular to network function redundancy.

BACKGROUND

IMS service hosted by wireless communication networks relies on the orchestration of a number of different network functions comprising the network infrastructure. The network repository function (NRF) of a wireless network stores information relating to the network infrastructure by which network functions can subscribe to other functions in support of IMS service. Of these network functions, the policy charging function (PCF) is responsible for managing policy enforcement and Quality of Service (QoS) parameters for IMS sessions, ensuring adherence to service-level agreements, access control policies, and prioritization of multimedia traffic such as voice and video calls. For example, a PCF communicates with a session management function (SMF) to exchange session-related information, such as QoS requirements, policy rules, and session state updates. Similarly, an application function (AF) interacts with a PCF to provide context-specific policy requirements and session information, enabling the PCF to enforce policies tailored to the requirements of individual applications or services in a 5G network.

When a network function goes down, the loss of the function can result in service disruption for users relying on that function as well as degradation in overall network performance, such as increased latency, packet loss, or reduced throughput. This in turn can affect the user experience and the QoS of many other users accessing the network. To make the network more robust or more resilient in case of failure, networks may implement different types of redundant systems or mechanisms. However, implementing systems for redundancy can introduce additional complexity and cost in network design. And even with redundant systems in place, there may still be a disruption in service continuity, albeit less extensive than without redundancy, but which still results in degraded network performance.

OVERVIEW

Technology is disclosed herein for onboarding a policy charging function (PCF) of a wireless network to replace another network PCF. In an implementation, a network repository function (NRF) determines that a first PCF is offline or unavailable and identifies at least one other network function which is subscribed to the first PCF. The NRF instructs the network function to replace an identity of the first PCF with an identity of a second PCF in a PCF profile maintained by the network function. The network function, in response to the instruction, sends to the second PCF session information for active sessions associated with the first PCF along with a flag indicating that the active sessions are active. The second PCF receives the session information and rebuilds the active sessions in a database. The second PCF then manages the active sessions based on the session information in place of the first PCF.

In an implementation, the second PCF rebuilds the active session by storing the session information received from the network function in a session database, including Quality of Service parameters and policy rules of the active sessions. In various implementations, the network function is a session management function or an application function of the wireless network.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
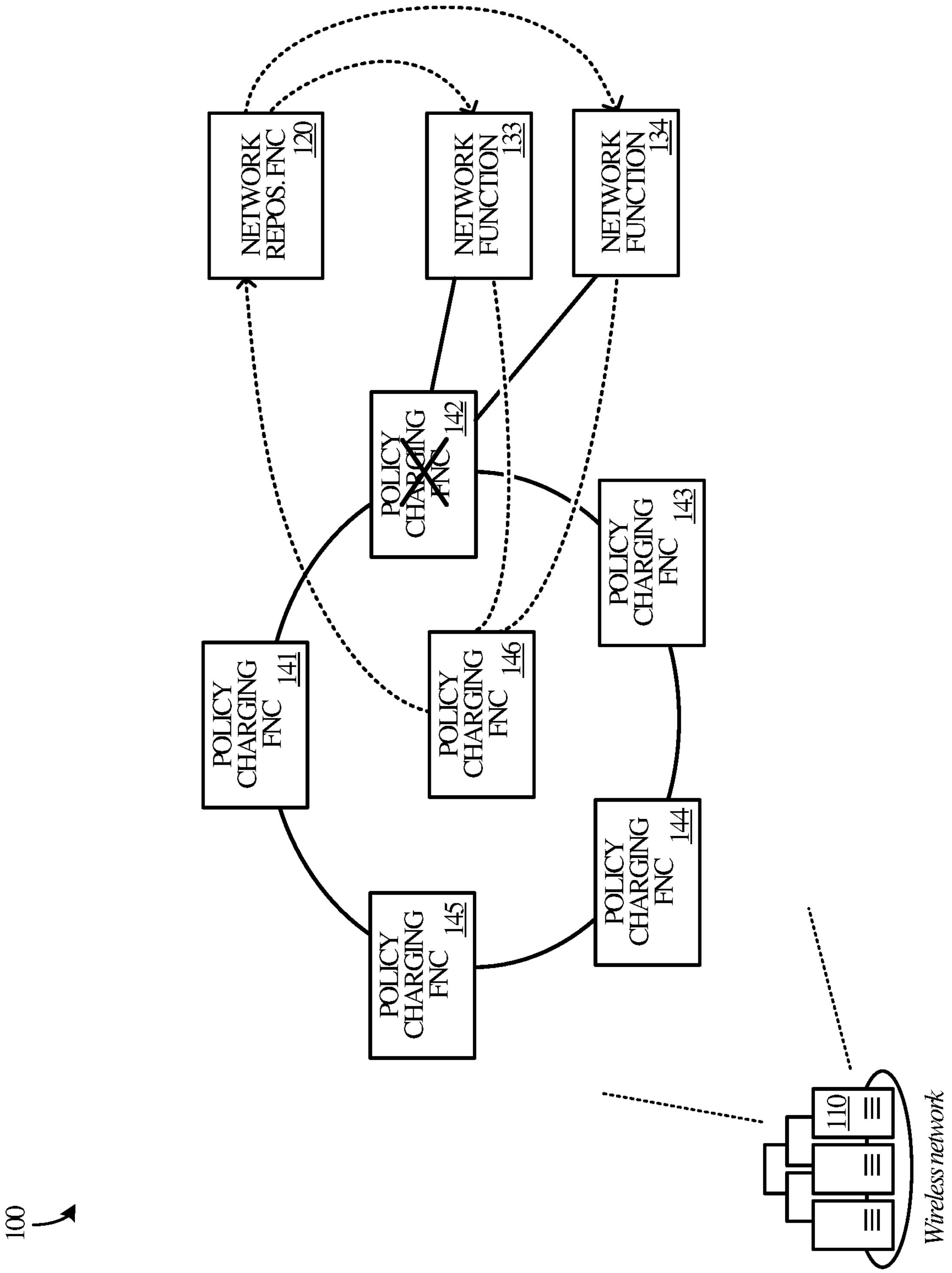
FIG. 1 illustrates an operational environment for onboarding a PCF to replace another PCF in an implementation.

Various implementations are disclosed herein for onboarding a policy charging function (PCF) of a $5^{th}$ Generation New Radio (5G-NR) network core to replace another network PCF and building out the standby PCF's session database for in-flight sessions, thus enabling the standby PCF to take over processing messages for active sessions and allowing service to continue without disruption. Because the standby PCF can replace an in-service PCF, a single standby PCF can serve as redundancy for multiple in-service PCFs, ensuring continuity of policy enforcement and session management for the in-progress sessions without having to keep a spare PCF in synchronization with each of the in-service PCFs.

In an implementation, when a PCF fails or otherwise becomes unavailable, to allow in-progress calls to continue, a network repository function (NRF) in communication with the PCF receives an indication of the PCF status and proceeds with onboarding a replacement PCF. To onboard the replacement PCF, the NRF deregisters the unavailable PCF (if it is still registered) and registers the replacement PCF. The NRF also notifies the PCF's customers, such as the session management function (SMF) and the application function (AF), that were in communication with the now-deregistered PCF about the PCF swap via messages including NFStatusNotify data objects (e.g., JavaScript Object Notation (JSON) objects). The NFStatusNotify messages may include NFInstanceIDs for the deregistered PCF and for the replacement PCF. In various implementations, the messages sent to the PCF's customers indicate the event type, i.e., that the PCF is being replaced, and provide the Uniform Resource Identifier (URI) of the replacement PCF. Upon receiving the notification from the NRF, the SMF and AF send session information relating to the in-progress (i.e., existing) sessions to the replacement PCF according to its URI.

In an implementation, to recreate the existing session information in the replacement PCF, the SMF sends session information for active sessions in the form of Create messages to the replacement PCF via the N7 interface, including a flag which indicates to the PCF that that session information relates to an existing session rather than a new session. Similarly, the AF sends Create messages including session information for active sessions to the replacement PCF via the N5 interface, including a flag which indicates to the PCF that that session information relates to an existing session rather than a new session. Upon receiving the Create messages from the SMF and AF, the PCF builds out its database with existing session information and assumes control of the existing sessions, processing subsequent messages for the existing sessions to maintain continuity of service.

The NRF may be notified of or alerted to a PCF becoming unavailable in a number of different ways. For example, the NRF may be manually or automatically notified of the PCF becoming unavailable from an external source, such as a network operator may notify the NRF while manually initiating a PCF swap for maintenance. A catastrophic failure of the PCF may be detected by the NRF or by another network function which alerts the NRF. In some scenarios, the NRF may detect that the PCF has become unavailable via a background detection system, such as detecting that the PCF is no longer emitting a "heartbeat." In other cases, the replacement PCF may notify the NRF of the PCF swap (e.g., via an NFRegister message), causing the NRF to remove the in-service PCF from its registry (if it is still registered) and to register the replacement PCF.

In various implementations, other types of network functions may be onboarded in place of other, active network functions of the same type. For example, a standby Uniform Data Repository (UDR) may be onboarded in place of a previously operational UDR by receiving subscriber data and session information from other network elements which were subscribed to the previously operational UDR. The network elements supplying information to the standby UDR may include a flag which indicates that the subscriber data and/or session information is for active or in-flight IMS service as opposed to newly created IMS sessions.

Technical effects of the technology disclosed herein enable in-progress Internet Protocol (IP) Multimedia Subsystem (IMS) sessions to be continued by recreating the session database of a newly unavailable PCF on a replacement PCF so that the in-progress sessions can continue uninterrupted. When a PCF fails, for example, in-service subscriber sessions will fail as well because other network functions will be unable to communicate with the PCF. And even if a new PCF were to be brought online to replace the failed PCF, without the session information, the new PCF would be unable to provide the necessary session information to maintain continuity of service. Such failures negatively impact service to the existing subscribers who are dropped as well as network KPIs. Instead, dynamically replacing PCFs in a way that preserves the existing sessions substantially reduces service degradation or disruption to the network's subscribers. Further, PCFs can be taken offline for maintenance, repair, or replacement with reduced disruption to network operations. Beyond improving network performance, the technology disclosed herein can also improve network reliability at a reduced cost: a single PCF can serve as redundancy for multiple in-service PCFs (such as a group of PCFs for a smaller geographic region with limited resources), improving the overall reliability of the 5G network for a lower cost than maintaining a stable of dedicated and synchronized PCFs on standby for each active PCF to ensure continuity of service for existing sessions.

Turning now to the Figures, FIG. 1 illustrates operational environment 100 for replacing a PCF of a wireless network by onboarding a second PCF in an implementation. Operational environment 100 includes wireless network core 110 including multiple PCFs 141-146, NRF 120, and network functions 133 and 134, which are representative of network functions such as SMFs, AMFs, AFs, and the like.

Figure 6:
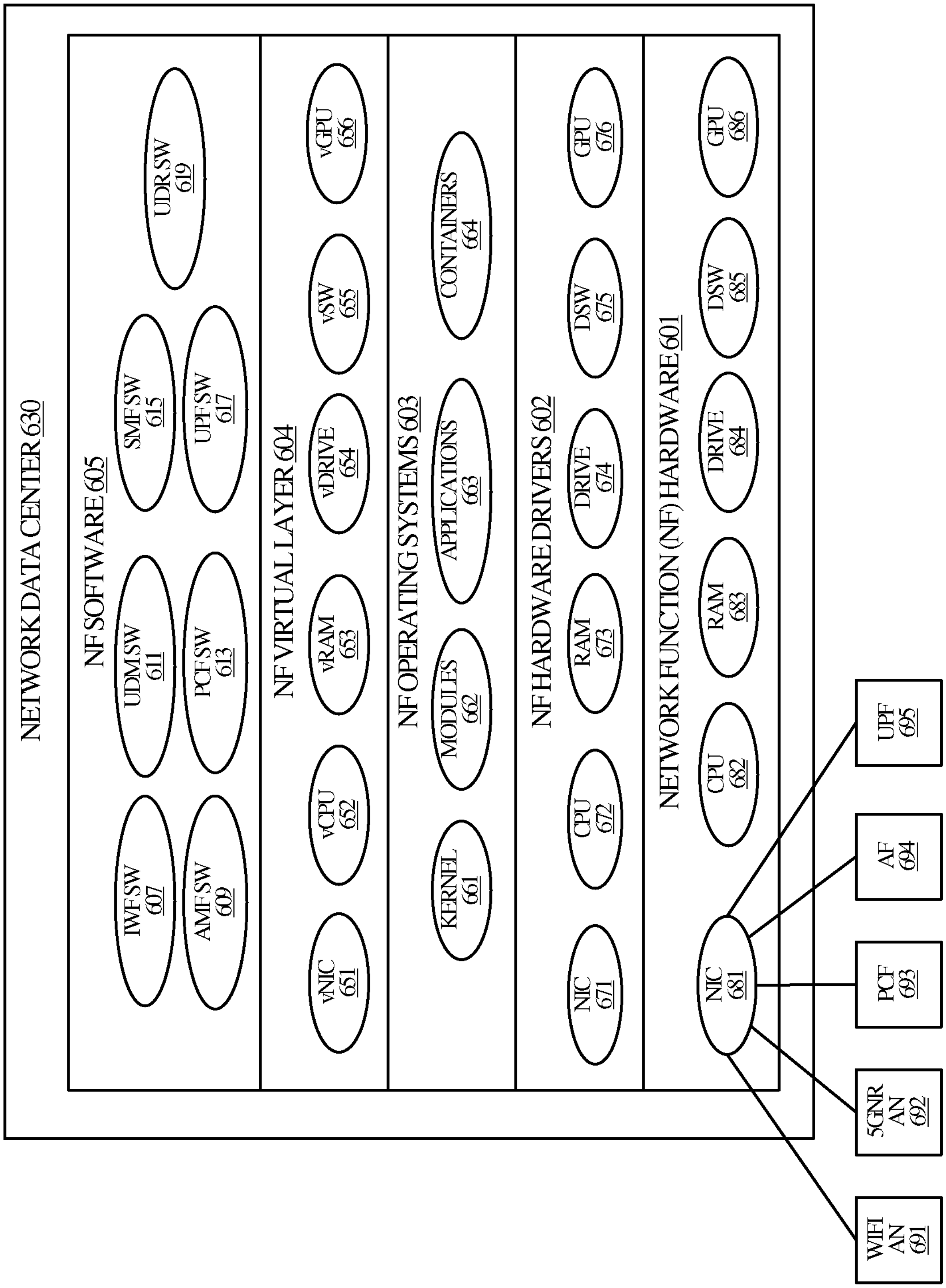
FIG. 6 illustrates a wireless network core architecture in an implementation.
Figure 7:
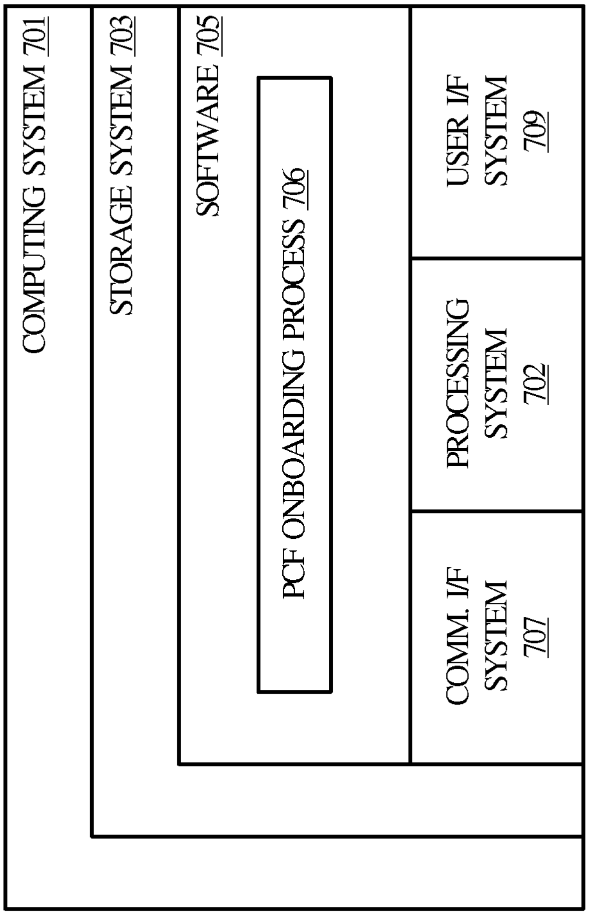
FIG. 7 illustrates a computing system suitable for implementing the various operational environments, architectures, processes, scenarios, and sequences discussed below with respect to the other Figures.

Wireless network 110 is representative of a communication network using a Fifth Generation New Radio (5G-NR), LTE, 6G, or other communication protocol to communicate with wireless devices, smartphones, computers, sensors, controllers, radios, or other user apparatus (not shown) with processing circuitry for wireless communication. In an implementation, wireless network 110 is representative of a service-based architecture (SBA) which includes network functions which constitute the control plane and user plane of a wireless communication network core, of which network data center 510 of FIG. 5 and network data center 630 of FIG. 6 are representative. The network functions of wireless network 110 are implemented on one or more suitable computing devices, of which computing device 701 of FIG. 7 is representative. Examples of suitable computing devices include server computers, blade servers, and the like. The network elements of wireless network 110 may be implemented in the context of one or more data centers in a co-located or distributed manner, or in some other arrangement.

Network repository function 120 is representative of a network function which serves as a centralized database responsible for storing and managing various network-related information. NRF 120 facilitates communication between network elements such as PCFs, SMFs, AMFs, and AFs, by hosting a repository for critical data such as user profiles, network topology, service configurations, and policy rules. NRF 120 supports dynamic network slicing, enabling the allocation of resources based on specific service requirements and user demands. NRF 120 may be implemented on one or more suitable computing devices, of which computing device 701 of FIG. 7 is representative. Examples include server computers, blade servers, and the like. NRF 120 may be implemented in the context of one or more data centers, in a co-located or distributed manner, or in some other arrangement.

Policy charging functions 141-146 are representative of a control-plane network function for managing policy control and charging functionalities of a wireless network, such as wireless network 110. PCFs 141-146 enforce policy rules related to network access, quality of service (QoS), and charging policies for subscribers, thereby ensuring that users are granted appropriate levels of access based on predefined policies, such as data speed limits or priority access for specific applications. PCFs 141-146 may also track and record usage data for billing and charging subscribers. PCFs 141-146 may collaborate with network functions 133 and 134 which are representative of SMFs, AMFs, AFs, or other network functions of wireless network 110. PCFs 141-146 may be implemented on one or more suitable computing devices, of which computing device 701 of FIG. 7 is representative. Examples include server computers, blade servers, and the like. PCFs 141-146 may be implemented in the context of one or more data centers, in a co-located or distributed manner, or in some other arrangement. It may be appreciated that although a ring topology is illustrated, the technology disclosed herein is applicable to other topologies (e.g., mesh, star, tree, bus) with no loss of generality.

Network functions 133 and 134 are representative of SMFs, AMFs, AFs, or other network functions of wireless network 110 which interact with various ones of PCFs 141-146 and NRF 120. A PCF of PCFs 141-146 may interact with an SMF of network functions 133 and 134 to authorize a session based on policy rules which is then established by the SMF. An AF of network functions 133 and 134 may provide additional context or requirements for a session, such as application-level QoS policies or authentication requirements. A PCF of PCFs 141-146 may interact with an AMF of network functions 133 and 134 to coordinate resource allocation and ensure that an active session's QoS requirements are met. Network functions 133 and 134 may be implemented on one or more suitable computing devices, of which computing device 701 of FIG. 7 is representative. Examples include server computers, blade servers, and the like. Network functions 133 and 134 may be implemented in the context of one or more data centers, in a co-located or distributed manner, or in some other arrangement.

In a brief operational example, IMS sessions are hosted by wireless network 110 and managed by PCF 142. PCF 146 serves as a standby or redundant PCF for PCFs 141-145. The IMS sessions may be authorized by PCF 142 which authorizes the session and which network function 133, such as an SMF, establishes, including allocating network resources and assigning IP addresses. Network function 133 may provide session-related information to PCF 142 including session state (e.g., active, idle, terminated), session identifiers, QoS parameters, session duration information, a user identity and location information associated with the session, and session policies. Network function 134, such as an AF, may provide additional requirements for the sessions. Network function 134 may provide application contextual information to PCF 142 including authentication and authorization data.

While the IMS sessions are in-progress, PCF 142 suffers a catastrophic failure. NRF 120 detects the failure by a detecting a lack of a heartbeat mechanism from PCF 142 or by a notification from PCF 146. For example, PCF 146 detects that PCF 142 has gone offline and notifies NRF 120 that PCF 142 is no longer available. The message sent by PCF 146 may include the URI or other identifier of PCF 142 as well as the URI or other identifier of PCF 146 in replacing PCF 142. Upon determining that PCF 142 is off-line, NRF 120 deregisters PCF 142 by removing PCF 142's registration information and capabilities from a network registry hosted by NRF 120 and registers PCF 146 in the registry as its replacement. NRF 120 notifies network functions 133 and 134 that PCF 142 has been replaced by PCF 146. The status notification sent by NRF 120 to network functions 133 and 134 includes an indication that a PCF has been replaced and URIs or identifiers for the now-defunct PCF 142 and replacement PCF 146.

When network functions 133 and 134 receive the notification of the PCF replacement from NRF 120, each of network functions 133 and 134 send session data that is associated with PCF 142 to PCF 146, instructing PCF 146 to create the sessions. The session data sent in the "Create" messages includes flags indicating that the session data is for sessions that are in-progress. PCF 146 receives the session data from network functions 133 and 134 and populates its session database with the session data, thereby replicating or recreating the session database of failed PCF 142. As the in-flight sessions continue, PCF 146 assumes control of the sessions and manages the sessions in place of PCF 142 as if the sessions had originated with PCF 146. Similarly, as new sessions are created, PCF 146 interacts with network functions 133 and 134 in service of those sessions.

Figure 2:
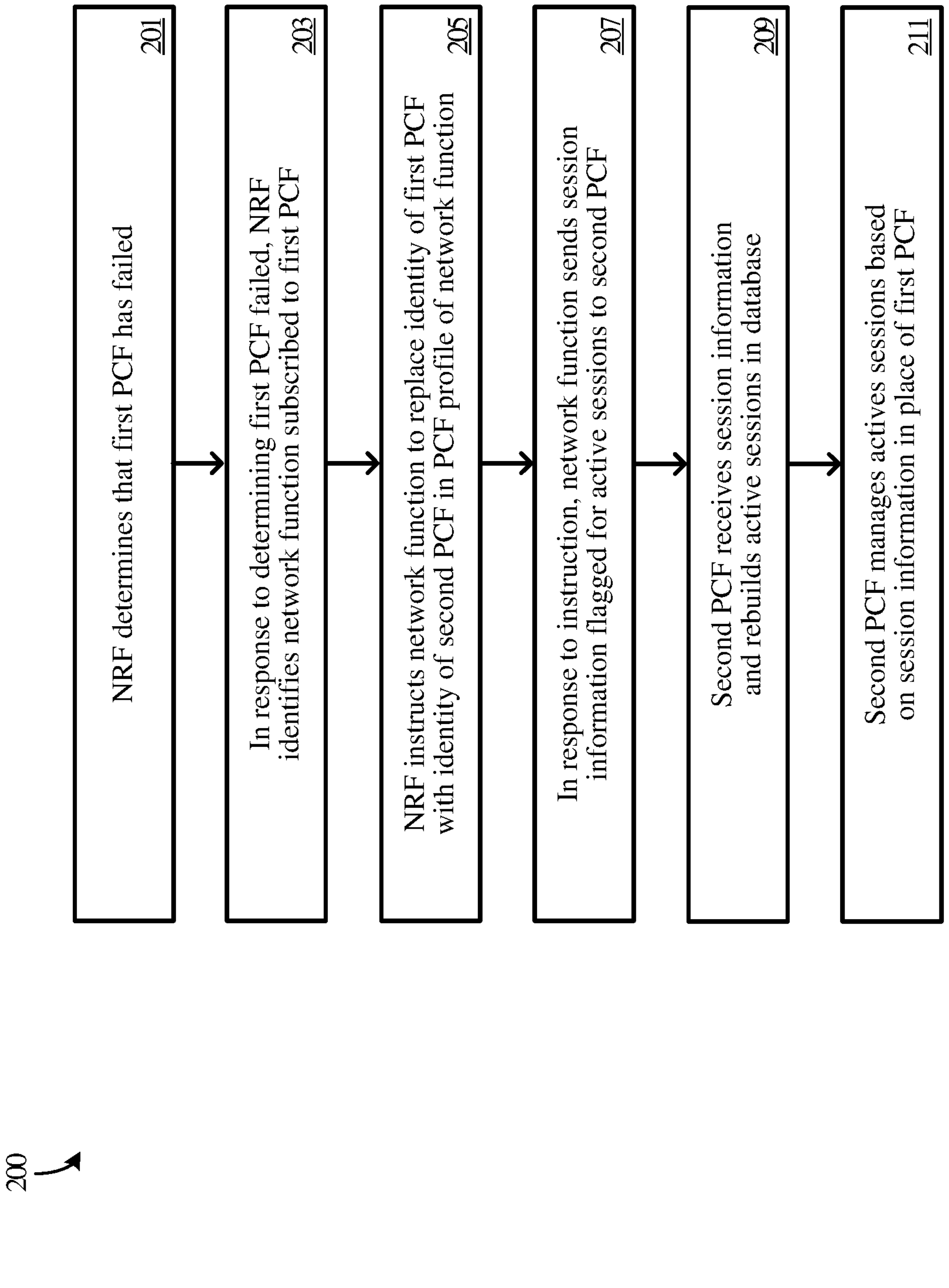
FIG. 2 illustrates a process for onboarding a PCF to replace another PCF in an implementation.

FIG. 2 illustrates a method for replacing a PCF of a wireless communication network by onboarding a second PCF in an implementation, herein referred to as process 200. Process 200 may be implemented in program instructions in the context of any of the software applications, modules, components, or other such elements of one or more computing devices. The program instructions direct the computing device(s) to operate as follows, referred to in the singular for the sake of clarity.

In process 200, an NRF of a wireless network determines that a first PCF of the wireless network has failed (step 201). In various implementations, the NRF is in communication with multiple network PCFs, each of which supports IMS service on the network. The NRF may detect that the first PCF has gone offline (e.g., from a lack of a response from the PCF or absence of a heartbeat). When the NRF detects that the first PCF is no longer available, the NRF may alert a second PCF, which may be registered with the NRF as a standby PCF, to take over for the failed or offline PCF.

In some scenarios, however, the NRF may be notified that the first PCF is offline by the second PCF. For example, the second PCF may serve as an N+1 redundant PCF which detects, determines, or is notified (e.g., by a network operator) that the first PCF is offline. In an implementation, the second PCF alerts the NRF that the second PCF is assuming control of the ongoing IMS sessions that were supported by the first PCF. The message sent by the second PCF to the NRF may be, for example, an NFRegister message which includes identifiers (e.g., NFInstanceIDs or URIs) for the first PCF as the PCF that is no longer in control of the sessions and for the second PCF as the PCF taking control of those sessions. When the NRF receives the alert, the NRF deregisters the first PCF from its registry and registers the second PCF in its place.

In response to determining that the first PCF has failed, the NRF identifies a network function which is subscribed to the first PCF (step 203). In an implementation, the NRF consults its network registry to identify one or more network functions, such as SMFs, AFs, and/or AMFs, which are customers of the failed PCF.

The NRF instructs an identified network function to replace the identity of the first PCF with the identity of the second PCF in a PCF profile hosted by the network function (step 205). In an implementation, the network function is an SMF or AF with session data for sessions controlled by the first PCF. The NRF may notify the network function of the change in PCF via a NFStatusNotify message. In the notification to the network function, the message may include identifiers for the PCF which is no longer available (i.e., the first PCF) and the PCF which is assuming control of the active sessions (i.e., the second PCF).

The network function, such as an SMF, may host or cache a PCF profile (e.g., a PCF network element of a client profile) of network functions to which it is subscribed or which are available to the SMF. Upon receiving the instruction from the NRF, the SMF (or other network function) swaps the identity of the first PCF for that of the second PCF in its stored profile. In some scenarios, the SMF may ping the NRF with an NF Discovery message to identify a PCF in configuring a client profile, and the NRF may return an identity of the second PCF in place of the first PCF.

In response to the instruction from the NRF, the network function sends session data flagged for active sessions to the second PCF (step 207). In an implementation, the network function sends an instruction to the second PCF to create (i.e., recreate) the session information in a session database of the second PCF, but to do so as an existing session rather than as a new session. For example, where the network function is an SMF, the SMF may send a Create message along the N7 interface for all the sessions that were active on the failed first PCF, including a flag to indicate that the sessions are active. The Create message may also include QoS parameters and rules that are applicable to the active sessions. Similarly, where the network function is an AF, the AF function may send its own Create message along the N5 interface for all the sessions that were active on the first PCF along with a flag indicating that the sessions are active.

The second PCF receives session information from the network function and rebuilds the active sessions in its session database (step 209). In an implementation, upon receiving session information from the network function, the second PCF populates its session database with the session information. In various implementations, the second PCF builds out its session database to replicate the session database of the first PCF, thereby allowing the second PCF to take control of the active sessions. In many cases, the second PCF receives information from both an SMF and an AF for a given IMS session and associates the session information for the given IMS session. The second PCF also receives session information for new sessions that would otherwise be directed to the first PCF prior to deregistration. As such, the first PCF which is offline, failed, or otherwise unavailable, no longer receives network communications from the SMF, AF, or other subscribed network functions with respect to the active sessions or future sessions.

With the session database populated, the second PCF assumes control of the active sessions and manages the sessions based on the session information received (step 211). In various implementations, throughout an active session, the second PCF continuously monitors and enforces policy rules. The second PCF may dynamically adjust policies based on changing network conditions, user behavior, or service requirements. When an active session is complete and the associated SMF releases the allocated resources, the second PCF updates its records and releases any associated policy rules.

It may be appreciated that although the above-described scenario refers to single network function and a single NRF, the technology disclosed herein is applicable to operational scenarios where the first PCF is in communication with multiple NRFs, SMFs, AFs, and AMFs, managing multiple IMS sessions for each. Thus, when the first PCF goes offline, each of the multiple NRFs alerts multiple network functions as to the PCF swap, and the second PCF receives session data from the multiple network functions.

Referring again to FIG. 1, operational environment 100 illustrates a brief example of process 200 as employed by elements of operational environment 100 in an implementation. In operation, wireless network 110 includes PCFs 141-146, NRF 120, and network functions 133 and 134 for servicing user equipment and devices (not shown). In an implementation, PCF 146 is a standby or redundant PCF for operating PCFs 141-145. For example, PCF 146 may replace any of PCFs 141-145 in the event that one of those PCFs goes offline. Network functions 133 and 134 are representative of network functions which are subscribed to PCF 142, such as SMFs or AFs of wireless network 110.

In a brief operational scenario illustrated steps of process 200, NRF 120 detects that PCF 142 is offline. For example, PCF 142 may have suffered a catastrophic failure or may have been taken offline for servicing. In some situations, NRF 120 is notified by standby PCF 146 to replace PCF 142. For example, NRF 120 may receive an NFRegister message from PCF 146 when PCF 146 detects that PCF 142 is no longer operational. The message indicates which PCF is being replaced (PCF 142) and which PCF will take its place (PCF 146). Upon receiving the message, NRF 120 deregisters PCF 142 from its network registry and registers PCF 146 in its place. NRF 120 also sends messages to various network function customers of PCF 142, of which network functions 133 and 134 are representative, including NFInstanceIDs for the offline PCF and the replacement PCF. For example, the message include an "NF_PROFILE_CHANGED" event with a path attribute including the URI of the replacement PCF (PCF 146) and an operation attribute of "Replace."

Upon receiving the notification from NRF 120 with respect to the profile change, network functions 133 and 134 send their active session information to PCF 146. In sending the active session information, the information is flagged to indicate that the sessions are in-flight rather than new sessions. The replacement PCF, PCF 146, now online with respect to NRF 120, receives session information from network functions 133 and 134 for active sessions of wireless network 110. PCF 146 populates its session database with the session information, including an indication that the associated sessions are active. In addition to assuming control of the active sessions, PCF 146 also services new sessions as they are established on wireless network 110.

Figure 3:
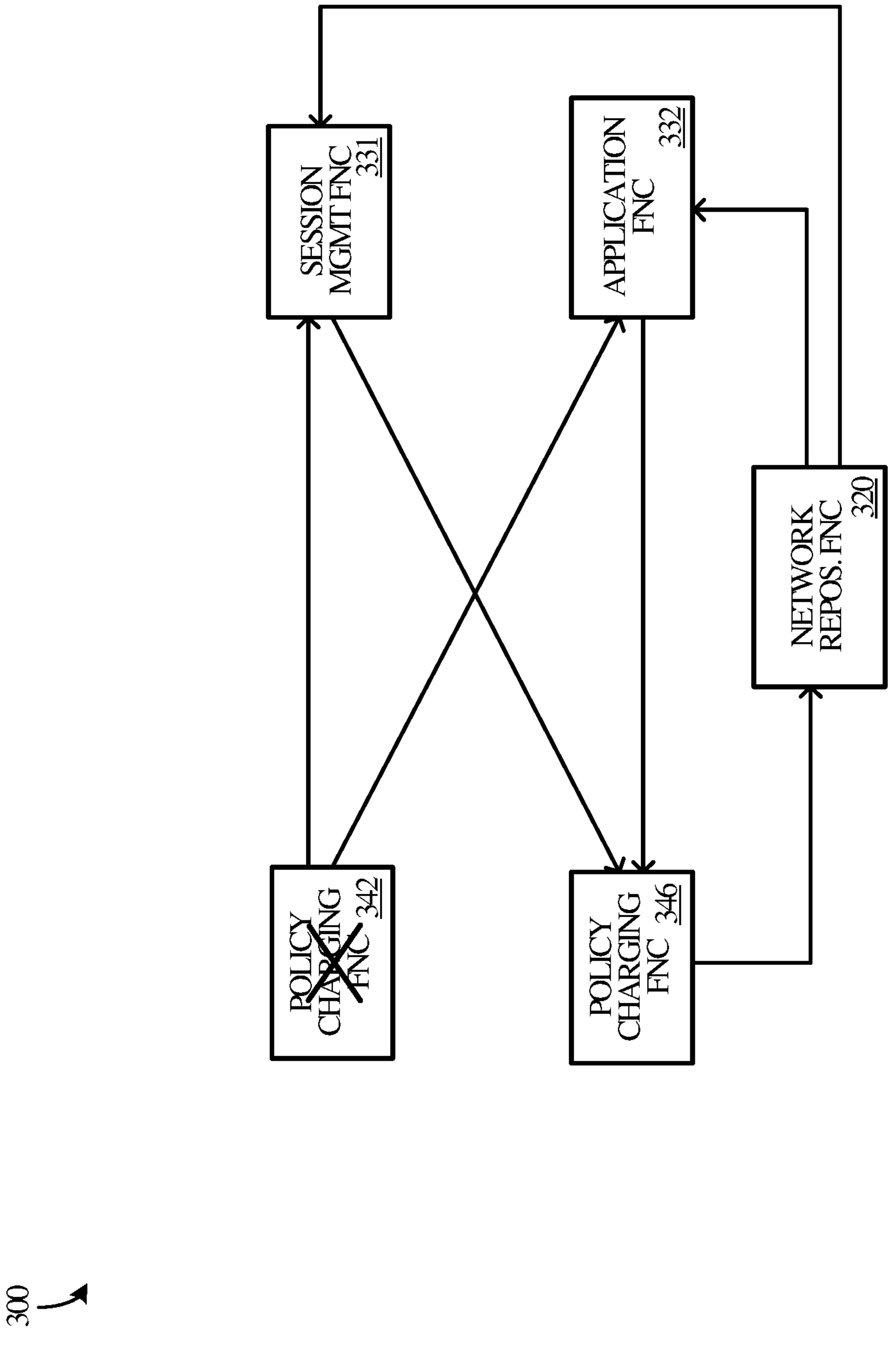
FIG. 3 illustrates an operational environment for onboarding a PCF to replace another PCF in an implementation.

Turning now to FIG. 3, operational environment 300 depicts a wireless network architecture for replacing a PCF of a wireless network by onboarding a second PCF in an implementation. The computing devices of operational environment 300 include NRF 320, of which NRF 120 of FIG. 1 is representative, PCFs 342 and 346, of which PCFs 142 and 146 are representative, and SMF 331 and AF 332, of which network functions 133 and 134 are representative. In operational environment 300, NRF 320 communicates with PCF 342 and 346 as well as SMF 331 and AF 332. PCFs 342 and 346 also communicate with SMF 331 and AF 332 to manage IMS sessions hosted by the network. In various implementations, PCF 342 is an active or operational PCF in support of IMS service of the wireless network, while PCF 346 is an inactive standby or redundant PCF for PCF 342 and possibly other PCFs. Communication between the various elements may be across application programming interfaces (APIs) hosted by various ones of the computing devices.

Figure 4:
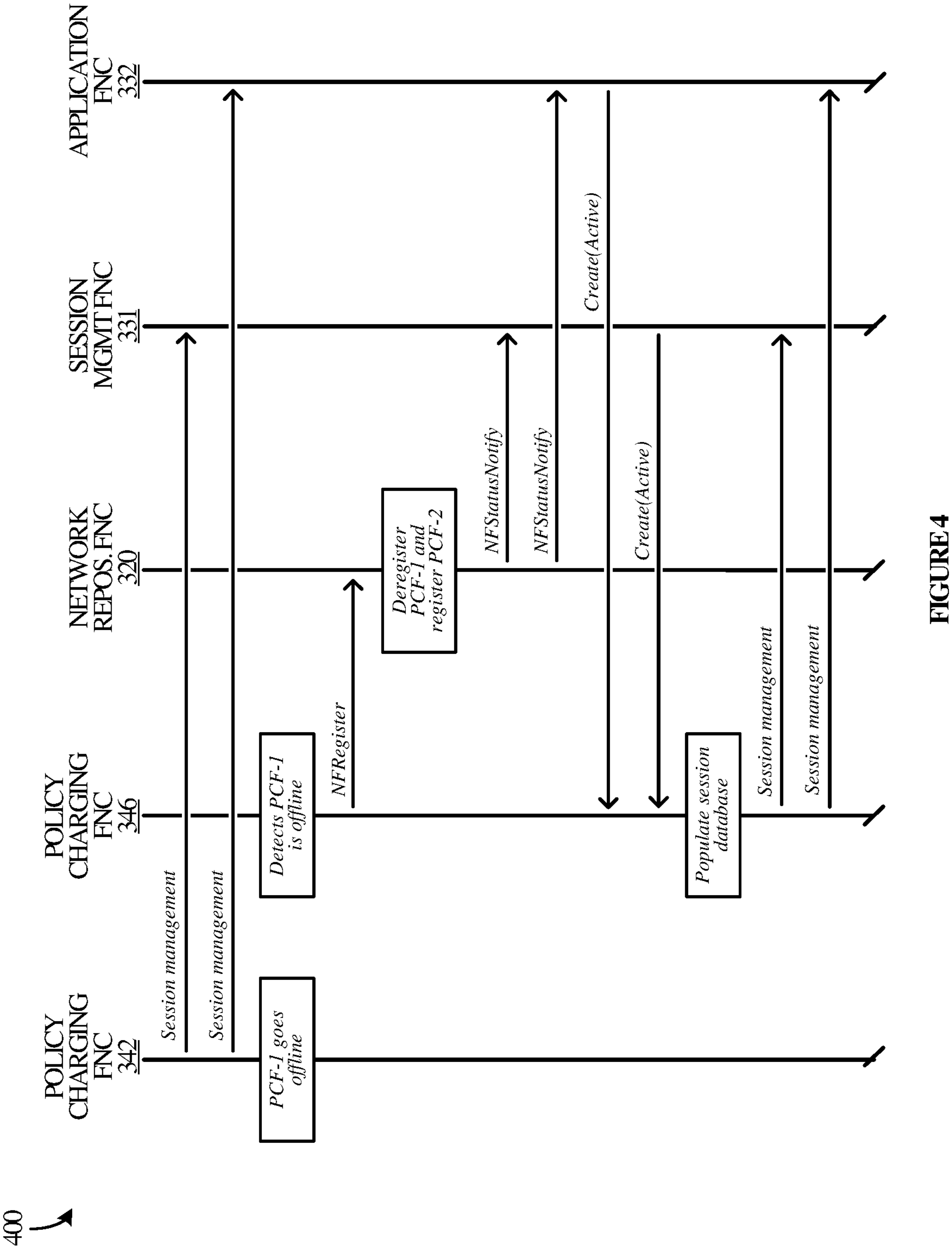
FIG. 4 illustrates a workflow for onboarding a PCF to replace another PCF in an implementation.

FIG. 4 illustrates workflow 400 for replacing a PCF of a wireless network by onboarding a second PCF in an implementation, referring to elements of operational environment 300. In workflow 400, PCF 342 manages IMS calls for the wireless network. In managing active sessions of IMS service, PCF 342 communicates with SMF 331 to provide subscriber policy and charging information and with AF 332 to receive application context information. PCF 342 communicates with other network functions, such as AMFs (not shown) and NRF 320 which stores network topography information and orchestrates communication between the various network functions, such as assigning SMF 331 to PCF 342 (and later PCF 346). PCF 342 stores session data for in-flight sessions and continuously monitors those sessions.

Continuing with the brief exemplary operation illustrating workflow 400, PCF 342 goes offline. PCF 346, on standby while PCF 342 is in operation, is alerted to the fact that PCF 342 is offline. PCF 342 sends an NFRegister notification to NRF 320 to update the registration of PCF 342 to the network topology and to deregister PCF 342. The notification includes identification information for each of the PCFs according to their roles in the equipment swap.

NRF 320 receives the notification from PCF 346 and, in response, deregisters PCF 342 and registers PCF 346 in its place. NRF 320 also sends NFStatusNotify notifications to SMF 331 and AF 332, causing those network functions to update the communication parameters with the URI or path of the PCF 346 in place of PCF 342. In addition, SMF 331 and AF 332 send messages to PCF 346 including information relating to the in-flight sessions by which PCF 346 populates its session database. The information sent by SMF 331 and AF 332 is tagged to indicate that the information relates to active or in-flight sessions, rather than to new sessions. With the session information, PCF 346 assumes control of the active sessions. PCF 346 also controls newly created IMS sessions in place of PCF 342.

Figure 5:
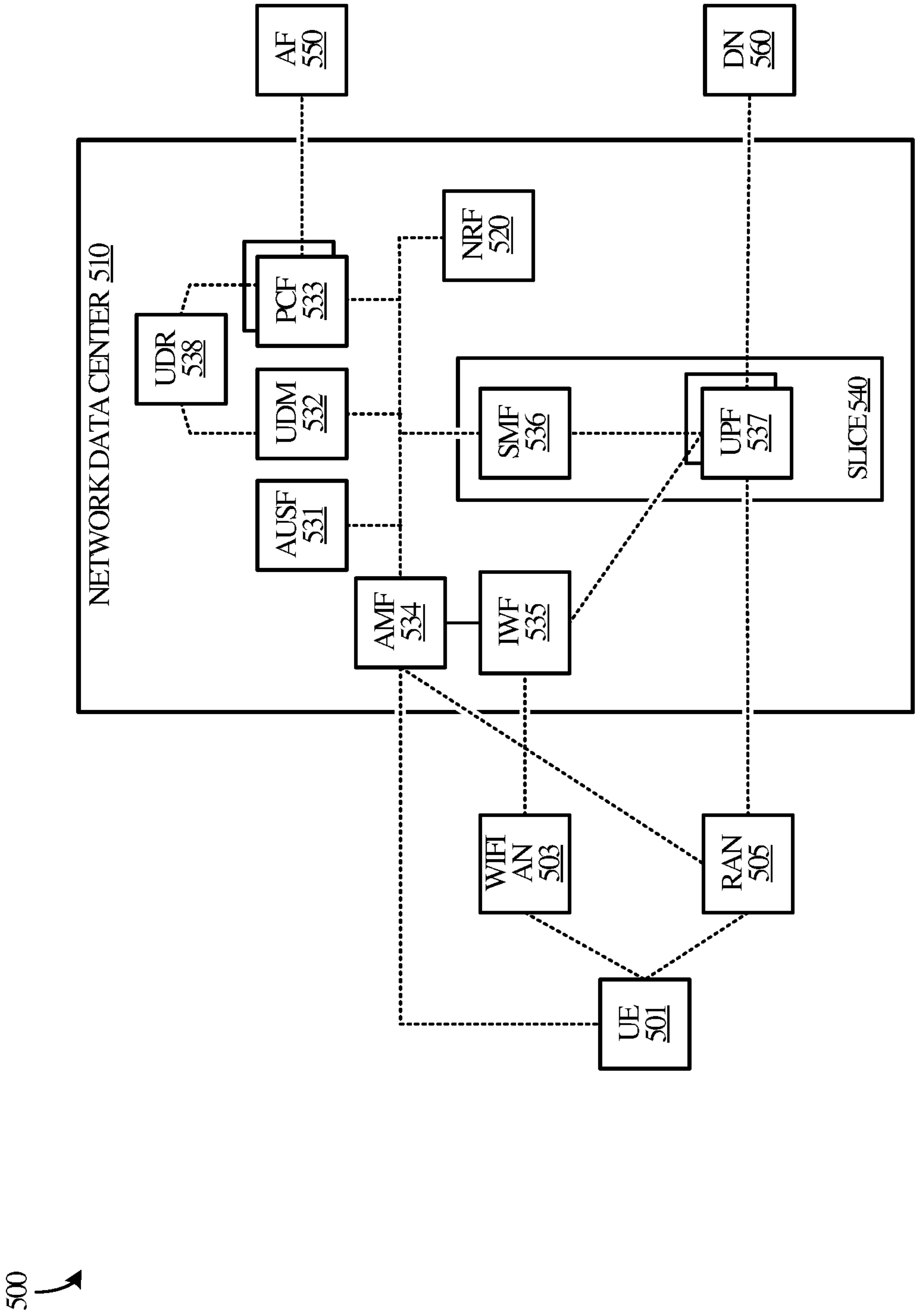
FIG. 5 illustrates a wireless communication network in an implementation.

FIG. 5 illustrates exemplary wireless communication system 500 that serves wireless User Equipment (UE) 501 based on policies. Wireless communication system 500 includes UE 501, Wifi Access Node (AN) 503, 5GNR RAN 505, Policy Charging Function (PCF) 520, Interworking Function (IWF) 535, Access and Mobility Management Function (AMF) 534, Authentication Server Function (AUSF) 531, Unified Data Management (UDM) 532, Policy Control Functions (PCFs) 533, Session Management Function (SMF) 536, User Plane Function (UPF) 537, Uniform Data Repository (UDR) 538, and Application Function (AF) 550. UDR 538 stores network data including subscriber profiles including identities, subscription details, service preferences, authentication credentials, and billing information. UDR 538 may also store policy data such as network rules, access rules, mobility rules, charging rules, and so on. AF 550 may provide policies applicable to control plane functions, that is, to the application, presentation, and/or session layers of the OSI protocol stack. IWF 535 includes non-3GPP IWFs (N3IWFs) for providing untrusted non-3GPP access to network data center 510, such as access via a non-cellular access network. Wireless network slice 540 includes UPF 537 and SMF 536. DN 560 is representative of a data network, Internet access, third-party resource, or other endpoint of an end-to-end communication path from UE 501.

In an implementation, UE 501 communicates with network data center 510 via 5G-NR access node 505 or Wifi access node 503. UE 501 requests access to DN 560 via the communication network of network data center 510. SMF 536 receives the access request from AMF 534 and other network functions of the communication network which are enforcing various aspects of the access request from UE 501. SMF 536 receives policies or policy decisions from AUSF 531, UDM 532, PCF 533, and/or AMF 534.

FIG. 6 illustrates exemplary network data center 630, a network core of a wireless communication system, of which wireless network 110 of FIG. 1 is representative. Network data center 630 includes network function (NF) software 605, network function virtual layer 604, network function operating systems 603, network function hardware drivers 602, and network function hardware 601.

Network function software 605 of network data center 630 includes software for executing various network functions: IWF software 607, AMF software 609, UDM software 611, PCF software 613, SMF software 615, UPF software 617, and UDR software 619. Other network function software, such as network repository function (NRF) software, are typically present but are omitted for clarity.

Network function virtual layer 604 includes virtualized components of network data center 630, such as virtual NIC 651, virtual CPU 652, virtual RAM 653, virtual drive 654, virtual software 655, and virtual GPU 656. Network operating systems 603 includes components for operating network data center 630, including kernels 661, modules 662, applications 663, and containers 664 for network function software execution. Network function hardware drivers 602 include software for operating network function hardware 601 of network data center 630, including network interface card (NIC) drivers 671 for network interface cards (NICs) 681, CPU drivers 672 for CPUs 682, RAM drivers 673 for RAM 683, flash/disk drive drivers 674 for flash/disk drives 684, data switch (DSW) drivers 675 for data switches 685, and drivers 676 for GPUs 686. Network interface cards 681 of network function hardware 601 include hardware components for communicating with Wifi access node 691, 5GNR access node 692, PCF 693, application server 694, and UPF 695.

FIG. 7 illustrates computing device 701 that is representative of any system or collection of systems in which the various processes, programs, services, and scenarios disclosed herein may be implemented. Examples of computing device 701 include, but are not limited to, desktop and laptop computers, tablet computers, mobile computers, and wearable devices. Examples may also include server computers, web servers, cloud computing platforms, and data center equipment, as well as any other type of physical or virtual server machine, container, and any variation or combination thereof.

Computing device 701 may be implemented as a single apparatus, system, or device or may be implemented in a distributed manner as multiple apparatuses, systems, or devices. Computing device 701 includes, but is not limited to, processing system 702, storage system 703, software 705, communication interface system 707, and user interface system 709 (optional). Processing system 702 is operatively coupled with storage system 703, communication interface system 707, and user interface system 709.

Processing system 702 loads and executes software 705 from storage system 703. Software 705 includes and implements PCF onboarding process 706, which is (are) representative of the PCF onboarding processes discussed with respect to the preceding Figures, such as process 200 and workflow 400. When executed by processing system 702, software 705 directs processing system 702 to operate as described herein for at least the various processes, operational scenarios, and sequences discussed in the foregoing implementations. Computing device 701 may optionally include additional devices, features, or functionality not discussed for purposes of brevity.

Referring still to FIG. 7, processing system 702 may comprise a micro-processor and other circuitry that retrieves and executes software 705 from storage system 703. Processing system 702 may be implemented within a single processing device but may also be distributed across multiple processing devices or sub-systems that cooperate in executing program instructions. Examples of processing system 702 include general purpose central processing units, graphical processing units, application specific processors, and logic devices, as well as any other type of processing device, combinations, or variations thereof.

Storage system 703 may comprise any computer readable storage media readable by processing system 702 and capable of storing software 705. Storage system 703 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 703 may also include computer readable communication media over which at least some of software 705 may be communicated internally or externally. Storage system 703 may be implemented as a single storage device but may also be implemented across multiple storage devices or sub-systems co-located or distributed relative to each other. Storage system 703 may comprise additional elements, such as a controller, capable of communicating with processing system 702 or possibly other systems.

Software 705 (including PCF onboarding process 706) may be implemented in program instructions and among other functions may, when executed by processing system 702, direct processing system 702 to operate as described with respect to the various operational scenarios, sequences, and processes illustrated herein. For example, software 705 may include program instructions for implementing a PCF onboarding process as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 705 may include additional processes, programs, or components, such as operating system software, virtualization software, or other application software. Software 705 may also comprise firmware or some other form of machine-readable processing instructions executable by processing system 702.

In general, software 705 may, when loaded into processing system 702 and executed, transform a suitable apparatus, system, or device (of which computing device 701 is representative) overall from a general-purpose computing system into a special-purpose computing system customized to support PCF onboarding processes in an optimized manner. Indeed, encoding software 705 on storage system 703 may transform the physical structure of storage system 703. The specific transformation of the physical structure may depend on various factors in different implementations of this description. Examples of such factors may include, but are not limited to, the technology used to implement the storage media of storage system 703 and whether the computer-storage media are characterized as primary or secondary storage, as well as other factors.

For example, if the computer readable storage media are implemented as semiconductor-based memory, software 705 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 707 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing device 701 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Indeed, the included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. A method of operating a wireless network comprising:

determining, by a Network Repository Function (NRF) of the wireless network, that a first Policy Charging Function (PCF) has failed;

in response to determining that the first PCF has failed, identifying, by the NRF, at least one other network function subscribed to the first PCF;

instructing, by the NRF, the at least one other network function to replace an identity of the first PCF, in a PCF profile maintained by the at least one other network function, with an identity of a second PCF;

in response to being instructed by the NRF, sending, by the at least one other network function, session information for active sessions associated with the first PCF, along with a flag indicating that the active sessions remain active to the second PCF;

receiving, by the second PCF, the session information from the at least one other network function;

rebuilding, by the second PCF, the active sessions in a database of the second PCF based on the session information; and managing, by the second PCF, the active sessions based on the session information in place of the first PCF.

2. The method of claim 1, wherein the at least one other network function comprises a Session Management Function (SMF) of the wireless network.

3. The method of claim 1, further comprising:

identifying, by the NRF, a second other network function subscribed to the first PCF;

instructing, by the NRF, the second other network function to replace an identity of the first PCF, in a PCF profile maintained by the second other network function, with an identity of the second PCF; and in response to being instructed by the NRF, sending, by the second other network function, second session information for the active sessions associated with the first PCF, along with a second flag indicating that the active sessions remain active to the second PCF.

4. The method of claim 3, further comprising:

receiving, by the second PCF, the second session information from the second other network function;

rebuilding, by the second PCF, the active sessions in a database of the second PCF based on the second session information; and managing, by the second PCF, the active sessions based on the second session information in place of the first PCF.

5. The method of claim 4, wherein the second other network function comprises an Application Function (AF).

6. The method of claim 1, wherein determining, by the NRF, that the first PCF has failed comprises receiving a notification from the second PCF including an indication to deregister the first PCF.

7. The method of claim 1, further comprising registering, by the NRF, the second PCF in a network registry hosted by the NRF and deregistering the first PCF from the network registry.

8. The method of claim 1, wherein rebuilding, by the second PCF, the active sessions in the database of the second PCF comprises storing the session information from the one other network function in a session database, wherein the session information comprises one or more of Quality-of-Service (QoS) parameters and policy rules of the active sessions.

9. A wireless communication network comprising:

a Network Repository Function (NRF), a first Policy Charging Function (PCF), one other network function, a second PCF, and network circuitry comprising one or more processors and memory;

the network circuitry configured to host the NRF, first PCF, the one other network function, and the second PCF;

the NRF configured to:

determine that the first PCF of the wireless communication network has failed;

in response to determining that the first PCF has failed, identify that at least the one other network function is subscribed to the first PCF; and instruct the one other network function to replace an identity of the first PCF, in a PCF profile maintained by the one other network function, with an identity of a second PCF;

the one other network function configured to, in response to being instructed by the NRF, send session information for active sessions associated with the first PCF, along with a flag indicating that the active sessions remain active to the second PCF; and the second PCF configured to:

receive the session information from the one other network function;

rebuild the active sessions in a database of the second PCF based on the session information; and manage the active sessions based on the session information in place of the first PCF.

10. The wireless communication network of claim 9, wherein the one other network function comprises a Session Management Function (SMF) of the wireless communication network.

11. The wireless communication network of claim 9, further comprising a second other network function, wherein:

the network circuitry is further configured to host the second other network function;

the NRF is further configured to:

identify that the second other network function is subscribed to the first PCF;

instruct the second other network function to replace an identity of the first PCF, in a PCF profile maintained by the second other network function, with an identity of the second PCF; and the second other network function is configured to, in response to being instructed by the NRF, send second session information for the active sessions associated with the first PCF, along with a second flag indicating that the active sessions remain active to the second PCF.

12. The wireless communication network of claim 11, wherein the second PCF is further configured to:

receive the second session information from the second other network function;

rebuild the active sessions in a database of the second PCF based on the second session information; and manage the active sessions based on the second session information in place of the first PCF.

13. The wireless communication network of claim 12, wherein the second other network function comprises an Application Function (AF).

14. The wireless communication network of claim 9, wherein to determine that the first PCF has failed, the NRF is further configured to receive a notification from the second PCF including an indication to deregister the first PCF.

15. The wireless communication network of claim 9, wherein the NRF is further configured to register the second PCF in a network registry hosted by the NRF and to deregister the first PCF from the network registry.

16. The wireless communication network of claim 9, wherein to rebuild the active sessions in the database of the second PCF, the second PCF is configured to store the session information from the one other network function in a session database, wherein the session information comprises one or more of Quality-of-Service (QoS) parameters and policy rules of the active sessions.

17. One or more non-transitory computer-readable storage media having program instructions stored thereon that, when executed by one or more processors of a computing device, direct the computing device to:

determine that a first Policy Charging Function (PCF) of a wireless network has failed;

in response to determining that the first PCF has failed, identify at least one other network function subscribed to the first PCF; and instruct the one other network function to replace an identity of the first PCF, in a PCF profile maintained by the at least one other network function, with an identity of a second PCF.

18. The one or more non-transitory computer-readable storage media of claim 17, wherein the at least one other network function comprises a Session Management Function (SMF) of the wireless network.

19. The one or more non-transitory computer-readable storage media of claim 17, wherein the program instructions further direct the computing device to:

identify a second other network function subscribed to the first PCF; and instruct the second other network function to replace an identity of the first PCF, in a PCF profile maintained by the second other network function, with an identity of the second PCF.

20. The one or more non-transitory computer-readable storage media of claim 17, wherein the program instructions further direct the computing device to register the second PCF in a network registry hosted by the computing device and deregister the first PCF from the network registry.

* * * * *